(12) United States Patent
Maas et al.

(10) Patent No.: US 8,687,566 B2
(45) Date of Patent: Apr. 1, 2014

(54) METHOD AND APPARATUS FOR SCHEDULING DOWNLINK TRANSMISSIONS IN AN ORTHOGONAL FREQUENCY DIVISION MULTIPLEXING COMMUNICATION SYSTEM

(75) Inventors: David R. Maas, Hoffman Estates, IL (US); Jun Wang, Evanston, IL (US); Timothy J. Wilson, Rolling Meadows, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1382 days.

(21) Appl. No.: 12/240,253

(22) Filed: Sep. 29, 2008

(65) Prior Publication Data

US 2010/0080176 A1 Apr. 1, 2010

(51) Int. Cl.
  *G01R 31/08* (2006.01)
(52) U.S. Cl.
  USPC .......................................... 370/329; 370/260
(58) Field of Classification Search
  USPC .......................................... 370/329, 208, 344
  See application file for complete search history.

(56) References Cited

U.S. PATENT DOCUMENTS

| | | | |
|---|---|---|---|
| 7,319,718 B2 | 1/2008 | Roh et al. | |
| 7,385,934 B2 | 6/2008 | Uehara et al. | |
| 7,385,954 B2 | 6/2008 | Gopalakrishnan et al. | |
| 7,386,277 B2 | 6/2008 | Cho et al. | |
| 2003/0147474 A1* | 8/2003 | Ha et al. | 375/295 |
| 2007/0121547 A1* | 5/2007 | Huh et al. | 370/329 |
| 2007/0218904 A1* | 9/2007 | Park et al. | 455/436 |
| 2008/0267168 A1* | 10/2008 | Cai et al. | 370/352 |

FOREIGN PATENT DOCUMENTS

| | | |
|---|---|---|
| EP | 1973255 A1 | 9/2008 |
| WO | 2005083955 A1 | 9/2008 |

OTHER PUBLICATIONS

Nakamura, et al., "Adaptive Control of Link Adaptation for High Speed Downlink Packet Access (HSDPA) in W-CDMA," proceedings of the 5th International Symposium on Wireless Personal Multimedia Communications 2002, vol. 2, Oct. 27-30, 2002, pp. 382-386.

Farese, Luca: "The International Search Report and the Written Opinion of the International Search Authority", European Patent Office, Rijswijk, completed: Jan. 15, 2010, mailed: Jan. 22, 2010, all pages.

* cited by examiner

*Primary Examiner* — David Oveissi

(57) ABSTRACT

A communication system performs adaptive scheduling by considering present and past reported CQI values and other indications of channel conditions in scheduling a Modulation and Coding Scheme (MCS) and then executing a 'dithering' function in order to effectuate an MCS that is intermediate between adjacent discrete MCSs. In one embodiment, the communication system determines a first MCS based on a channel quality metric received from a mobile station (MS) and then transmits data utilizing the first MCS. The communication system assigns weights to each of the first MCS and a second MCS based on whether the transmitted data is acknowledged and, based on the assigned weights, selects one of the first and second MCSs for a subsequent transmission of data to the MS. The communication system also may assign weights to each of a first and second MCS based on a transition between a MIMO-A and a MIMO-B transmission scheme.

24 Claims, 8 Drawing Sheets

| CINR | MPR | MCS |
|---|---|---|
| CQI<4 | 0.16 | QPSK-1/2 rep 6 |
| 4 ≤ CQI ≤ 6 | 0.25 | QPSK-1/2 rep 4 |
| 7 ≤ CQI ≤ 10 | 0.5 | QPSK-1/2 rep 2 |
| 11 ≤ CQI ≤ 14 | 1 | QPSK-1/2 |
| 15 ≤ CQI ≤ 16 | 1.5 | QPSK-3/4 |
| 17 ≤ CQI ≤ 20 | 2 | 16QAM-1/2 |
| 21 ≤ CQI ≤ 23 | 3 | 16QAM-3/4 |
| 24 ≤ CQI ≤ 25 | 4 | 64QAM-2/3 |
| 26 ≤ CQI ≤ 27 | 4.5 | 64QAM-3/4 |
| CQI ≥ 28 | 5 | 64QAM-5/6 |

601

603

Example: If S = 3.15:
64QAM-2/3 (MPR 4) selected 15% of the time
16QAM-3/4 (MPR 3) selected 85% of the time
(.15 * 4) + (.85 * 3) = 3.15

S always changing, so % applied on each new burst

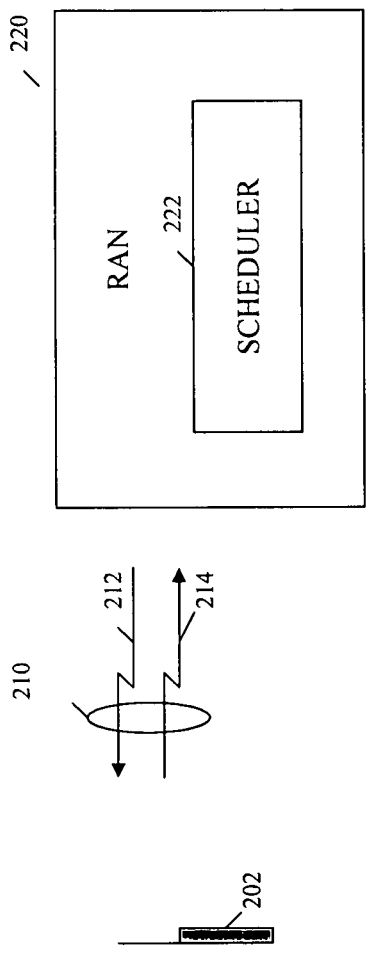
FIG. 2
FIG. 3
FIG. 4

800

METHOD AND APPARATUS FOR SCHEDULING DOWNLINK TRANSMISSIONS IN AN ORTHOGONAL FREQUENCY DIVISION MULTIPLEXING COMMUNICATION SYSTEM

FIELD OF THE INVENTION

The present invention relates generally to Orthogonal Frequency Division Multiplexing (OFDM) communication systems, and, in particular, to scheduling downlink transmissions in an OFDM communication system.

BACKGROUND OF THE INVENTION

The IEEE (Institute of Electrical and Electronics Engineers) 902.16 standards propose using Orthogonal Frequency Division Multiple Access (OFDMA) for transmission of data over an air interface. OFDMA has also been proposed for use in 3GPP (Third Generation Partnership Project) Evolution communication systems. In an OFDMA communication system, a frequency bandwidth is split into multiple contiguous frequency sub-bands, each sub-band comprising multiple sub-carriers, that are transmitted simultaneously. A user may then be assigned one or more of the frequency sub-bands for an exchange of user information, thereby permitting multiple users to transmit simultaneously on the different sub-carriers. These sub-carriers are orthogonal to each other, and thus intra-cell interference is minimized.

In order to maximize bandwidth usage, for any given Transmission Time Interval (TTI) the sub-bands may be allocated to users based on a reported Channel Quality Information (CQI) value. Further, an appropriate Modulation and Coding Scheme (MCS) is determined for each sub-band and each TTI based on the CQI value. That is, a mobile station (MS) measures channel conditions, such as a Carrier power over the Interference plus Noise power Ratio (CINR), for a common pilot channel or a preamble for each and every sub-band during a measuring period, such as a Transmission Time Interval (TTI) (also known as a sub-frame) or a radio frame transmission period. The MS then reports a Channel Quality Information (CQI) value corresponding to an average of the measured channel conditions across all of the sub-bands to a serving base station or access point in a CQI message. Based on the most recent reported value, a scheduler of an access network serving the MS selectively schedules the sub-bands over a scheduling period, typically one or more TTIs or radio frames, and further determines an appropriate modulation and coding schemes for each sub-band during the scheduling period.

For example, FIG. 1 is a table 100 depicting an exemplary mapping of downlink modulation schemes and coding rates to a CQI value reported in a CQI message. The first column 101 of the table lists ranges of CQI values that may be reported by a MS. Typically, the reported values are integer values. The second column 102 of the table lists the modulation schemes, error encoding rates, and repetition rates, hereinafter collectively referred to as Modulation and Coding Schemes (MCSs), discretely mapped by a scheduler to the corresponding CQI values reported by the MS.

Downlink scheduling based on a reported CQI value provides a simple, straight-forward scheduling scheme. However, in order to best assure acceptable service to all reporting MSs, mapping tables such as table 100 typically have been developed to provide an acceptable MCS to a lowest common denominator among MSs. That is, such tables are based on a 'one size fits all' conservative approach to MCS scheduling where, for a given CQI value, the value is mapped to an MCS that is expected to provide acceptable reception for all possible MSs over all possible channel conditions that may be associated with such a CQI value. Such a methodology fails to take advantage of individual variations among the MSs and the environments that they are operating in that may permit more aggressive scheduling for some MSs as opposed to other MSs reporting a same CQI value.

For example, such a methodology fails to consider the sensitivity of an MS's receiver or whether the MS is capable of decoding a particular MCS. Furthermore, the CQI reported by an MS tells little about the fading conditions being experienced by the MS, for example, the CQI fails to distinguish between MSs that report a same CQI value but are experiencing different fading conditions due to travel at different velocities. In addition, use of such mapping tables fail to adequately consider that different MSs, for example, from different MS manufacturers, have different sensitivities and quality of manufacture that may cause them to report different CQI values when operating under identical channel conditions.

Therefore, a need exists for an improved method and apparatus for downlink scheduling in an OFDM communication system.

BRIEF DESCRIPTION OF THE DRAWINGS

FIG. 2 is a block diagram of a wireless communication system in accordance with an embodiment of the present invention.

FIG. 3 is a block diagram of a mobile station of the communication system of FIG. 2 in accordance with an embodiment of the present invention.

FIG. 4 is a block diagram of a scheduler of the communication system of FIG. 2 in accordance with an embodiment of the present invention.

Figure 1:
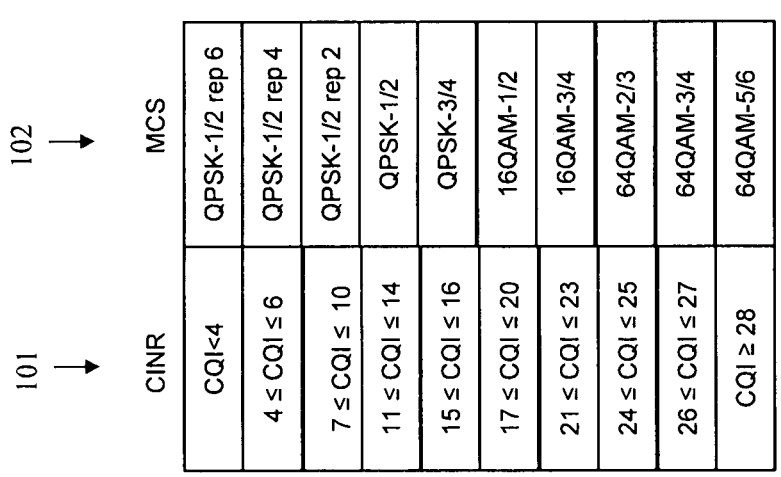
FIG. 1 is a table of Channel Quality Information (CQI) values that may be reported by a mobile station and the corresponding modulation schemes and coding rates that may be mapped to those values in accordance with the prior art.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and an apparatus that provides an improved method and apparatus for downlink scheduling in an Orthogonal Frequency Division Multiplexing (OFDM) communication system, a communication system is provided that implements an adaptive scheduling scheme that considers present and past reported CQI values as well as other indications of channel conditions in scheduling an Modulation and Coding Scheme (MCS), and then executes a 'dithering' function in order to effectuate, over time and in association with a received CQI value, an MCS scheme that is intermediate between two adjacent discrete MCS schemes. For example, the communication system receives, from a mobile station (MS), a channel quality metric associated with a frequency bandwidth, determines a first MCS based on the received channel quality metric, and transmits data utilizing the first MCS. The communication system determines whether the transmitted data is acknowledged, assigns weights to each of the first MCS and a second MCS based on the determination of whether the transmitted data is acknowledged, and based on the assigned weights, selects one of the first MCS and the second MCS for a subsequent transmission of data to the MS. Also, when the communication system transmits data utilizing a first MCS and one of a Multiple Input Multiple Output (MIMO)-A transmission scheme and a MIMO-B transmission scheme and then transitions to the other transmission scheme, the communication system may assign weights to each of the first MCS and a second MCS based on whether the transition is from MIMO-A to MIMO-B or MIMO-B to MIMO-A and, based on the assigned weights, select one of the first MCS and the second MCS for a subsequent transmission of data to the MS.

Generally, an embodiment of the present invention encompasses a method for a method for scheduling a downlink transmission in an OFDM communication system. The method includes receiving, from an MS, a channel quality metric associated with a frequency bandwidth, determining a first MCS based on the received channel quality metric, transmitting data utilizing the first MCS, determining whether the transmitted data is acknowledged, assigning weights to each of the first MCS and a second MCS based on the determination of whether the transmitted data is acknowledged, and based on the assigned weights, selecting one of the first MCS and the second MCS for a subsequent transmission of data to the MS.

Another embodiment of the present invention encompasses a method for scheduling a downlink transmission in an OFDM communication system. The method includes receiving, from an MS, a channel quality metric associated with a frequency bandwidth, determining a first Modulation and Coding Scheme (MCS) based on the received channel quality metric, transmitting data utilizing the first MCS and one of a Multiple Input Multiple Output (MIMO)-A transmission scheme and a MIMO-B transmission scheme, transitioning from the one of the MIMO-A and MIMO-B transmission schemes to the other of the MIMO-A and MIMO-B transmission schemes, assigning weights to each of the first MCS and a second MCS based whether the transition is from MIMO-A to MIMO-B or from MIMO-B to MIMO-A, and based on the assigned weights, selecting one of the first MCS and the second MCS for a subsequent transmission of data to the mobile station.

Yet another embodiment of the present invention encompasses a scheduler operable in an OFDM communication system the scheduler configured to receive, from an MS, a channel quality metric associated with a frequency bandwidth, determine a first MCS based on the received channel quality metric, transmit data utilizing the first MCS, determine whether the transmitted data is acknowledged, assign weights to each of the first MCS and a second MCS based on the determination of whether the transmitted data is acknowledged and, based on the assigned weights, selecting one of the first MCS and the second MCS for a subsequent transmission of data to the MS.

Still another embodiment of the present invention encompasses a scheduler operable in an OFDM communication system, the scheduler configured to receive, from an MS, a channel quality metric associated with a frequency bandwidth, determine a first MCS based on the received channel quality metric, transmit data utilizing the first MCS and one of a Multiple Input Multiple Output (MIMO)-A transmission scheme and a MIMO-B transmission scheme, transition from the one of the MIMO-A and MIMO-B transmission schemes to the other of the MIMO-A and MIMO-B transmission schemes, assign weights to each of the first MCS and a second MCS based whether the transition is from MIMO-A to MIMO-B or from MIMO-B to MIMO-A and, based on the assigned weights, select one of the first MCS and the second MCS for a subsequent transmission of data to the MS.

The present invention may be more fully described with reference to FIGS. 2-10. FIG. 2 is a block diagram of a wireless communication system 200 in accordance with an embodiment of the present invention. Communication system 200 includes at least one mobile station (MS) 202, such as but not limited to a cellular telephone, a radio telephone, a personal digital assistant (PDA), laptop computer, or personal computer with radio frequency (RF) capabilities, or a wireless modem that provides RF access to digital terminal equipment (DTE) such as a laptop computer. Communication system 200 further includes a Radio Access Network (RAN) 220 that provides communication services to users equipment, such as MS 202, residing in a coverage area of the RAN via an air interface 210.

RAN 220 includes a base station (BS) or an Access Point (AP) (not shown) in wireless communication with each MS, such as MS 102, serviced by the RAN. RAN 220 further may include an access network controller (not shown), such as a Radio Network Controller (RNC) or a Base Station Controller (BSC), coupled to the BS or AP; however, in other embodiments of the present invention, the functions of the access network controller may be included in the BS or AP. RAN 220 further includes a packet scheduler 222 that performs the scheduling functions described herein as being performed by the RAN. In various embodiments of the invention, scheduler 222 may be implemented in the BS/AP or controller of RAN 220, or scheduler 222 may be a separate module coupled to each of the BS/AP and controller.

Air interface 210 comprises a downlink 212 and an uplink 214. Each of downlink 212 and uplink 214 comprises multiple physical and logical communication channels, including multiple traffic channels and multiple signaling channels. The multiple signaling channels of uplink 214 include a channel quality feedback channel, such as a Channel Quality Information Channel (CQICH).

FIG. 3 is a block diagram of MS 202 in accordance with an embodiment of the present invention. MS 202 includes a processor 302, such as one or more microprocessors, microcontrollers, digital signal processors (DSPs), combinations thereof or such other devices known to those having ordinary skill in the art. The particular operations/functions of processor 302, and thus of MS 202, are determined by an execution of software instructions and routines that are stored in a respective at least one memory device 304 associated with the processor, such as random access memory (RAM), dynamic random access memory (DRAM), and/or read only memory (ROM) or equivalents thereof, that store data and programs that may be executed by the corresponding processor.

FIG. 4 is a block diagram of scheduler 222 in accordance with an embodiment of the present invention. Scheduler 222 includes a processor 402, such as one or more microprocessors, microcontrollers, digital signal processors (DSPs), combinations thereof or such other devices known to those having ordinary skill in the art. The particular operations/functions of processor 402, and respectively thus of scheduler 222, are determined by an execution of software instructions and routines that are stored in an at least one memory device 404 associated with the processor, such as random access memory (RAM), dynamic random access memory (DRAM), and/or read only memory (ROM) or equivalents thereof, that store data and programs that may be executed by the corresponding processor. In various embodiments of the present invention, when scheduler 222 is implemented in the BS/AP or controller of RAN 120, processor 402 may be the processor of the implementing network element and at least one memory device 404 may be a corresponding memory device of the implementing network element.

The embodiments of the present invention preferably are implemented within MS 202 and scheduler 222, and more particularly with or in software programs and instructions stored in the respective at least one memory device 304, 404 and executed by respective processors 302, 402 of the MS and scheduler. However, one of ordinary skill in the art realizes that the embodiments of the present invention alternatively may be implemented in hardware, for example, integrated circuits (ICs), application specific integrated circuits (ASICs), and the like, such as ASICs implemented in one or more of MS 202 and scheduler 222. Based on the present disclosure, one skilled in the art will be readily capable of producing and implementing such software and/or hardware without undo experimentation.

Communication system 200 comprises a wideband packet data communication system that employs an Orthogonal Frequency Division Multiplexing (OFDM) modulation scheme for transmitting data over air interface 210. Preferably, communication system 200 is an Orthogonal Frequency Division Multiple Access (OFDMA) communication system, wherein a frequency bandwidth employed by the communication system is split into multiple frequency sub-bands, or Resource Blocks (RBs), during a given time period. Each sub-band comprises multiple orthogonal frequency sub-carriers over a given number of OFDM symbols, that are the physical layer channels over which traffic and signaling channels are transmitted in a TDM or TDM/FDM fashion. The channel bandwidth also may be sub-divided into one or more sub-band groups, or Resource Block Groups (RBGs), wherein each sub-band group comprises one or more sub-bands that may or may not be contiguous, and the sub-band groups may or may not be of equal size. A communication session may be assigned one or more sub-bands or sub-band groups for an exchange of bearer information, thereby permitting multiple users to transmit simultaneously on the different sub-bands such that each user's transmission is orthogonal to the other users' transmissions.

In addition, communication system 200 preferably comprises a Worldwide Interoperability for Microwave Access (WiMAX) communication system that operates in accordance with the IEEE (Institute of Electrical and Electronics Engineers) 902.16 standards, which standards specify wireless telecommunications system operating protocols, including radio system parameters and call processing procedures. However, those who are of ordinary skill in the art realize that communication system 200 may operate in accordance with any wireless telecommunication system employing an Orthogonal Frequency Division Multiplexing (OFDM) modulation scheme, such as a 3GPP (Third Generation Partnership Project) E-UTRA (Evolutionary UMTS Terrestrial Radio Access) communication system, a 3GPP2 (Third Generation Partnership Project 2) Evolution communication system, for example, an Ultra Mobile Broadband (UMB) communication system, a Wireless Local Area Network (WLAN) communication system as described by the IEEE 902.xx standards, for example, the 902.11a/HiperLAN2, 902.11g, or 902.20 standards, or any of multiple proposed ultrawideband (UWB) communication systems.

In order for RAN 220, and more particularly scheduler 222, to schedule a Modulation and Coding Scheme (MCS) for a downlink transmission to an MS, such as MS 202, served by the RAN, communication system 200 provides an adaptive scheduling scheme that considers present and past reported CQI values as well as other indications of channel conditions in scheduling the MCS. In addition, unlike prior art scheduling schemes that schedule discrete MCS schemes where a singular MSC scheme is scheduled for a received CQI value, communication system 200 executes a 'dithering' function in order to effectuate, over time and in association with the received CQI value, an MCS scheme that is intermediate between two adjacent discrete MCS schemes.

Figure 5:
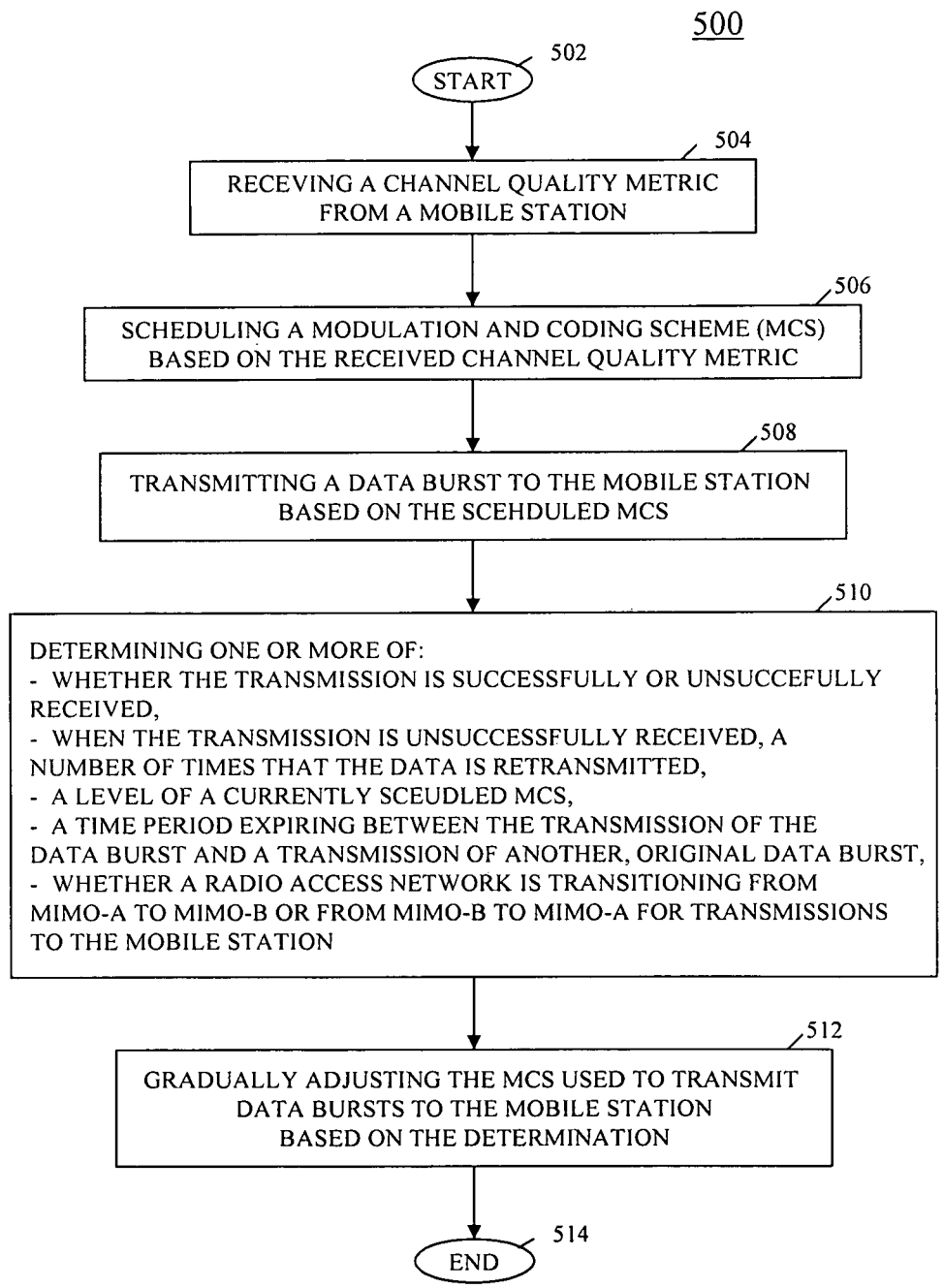
FIG. 5 is a logic flow diagram of a method executed by the communication system of FIG. 2 in scheduling a modulation and coding scheme (MCS) for a downlink transmission in accordance with various embodiments of the present invention.

Referring now to FIG. 5, a logic flow diagram 500 is provided that illustrates a method for scheduling an MCS by RAN 220, and in particular by scheduler 222, in accordance with various embodiments of the present invention. Logic flow diagram 500 begins (502) when the RAN 220 receives (504) a channel quality metric, preferably a CQI value as is known in the art, associated with one or more sub-bands of multiple sub-bands of a frequency bandwidth employed by communication system 200 over multiple measuring periods, such as a Transmission Time Interval (TTI) (also known as a sub-frame) or a radio frame transmission period. The channel quality metric may comprise, or may be based on, a received signal power, a Signal to Noise Ratio (SNR), a Carrier power to Interference plus Noise ratio (CINR), a Signal to Noise plus Interference power Patio (SINR), associated with a signal transmitted over a channel utilizing the sub-band and received by the MS, or may measure a bit error rate or a frame error rate associated with such a signal. One of ordinary skill in the art realizes that many channel quality metrics may be measured in determining channel quality and that any such parameter may be used herein without departing from the spirit and scope of the present invention.

Based on the reported channel quality metric, RAN 220, and in particular scheduler 222, schedules (506) a first one or more of a modulation scheme, an error coding rate, and a repetition rate (collectively referred to herein as a Modulation and Coding Scheme (MCS) and which has a corresponding product of a modulation order and a coding rate (MPR)) for a downlink data burst to the reporting MS. RAN 220 then transmits (508) a data burst to the MS utilizing the scheduled MCS. RAN 220 then determines (510) one or more of whether the transmission is successfully or unsuccessfully received by the MS, when the transmission is unsuccessfully received, a number of times that the data is retransmitted, a level of the currently scheduled MCS/MPR, a time period expiring between the transmission of the data burst and a transmission of another original (as opposed to a retransmission) data burst, and whether the RAN may be transitioning from MIMO (Multiple Input Multiple Output)-A to MIMO-B or from MIMO-B to MIMO-A for downlink transmissions to the MS. Based on the determination and prior to receipt of a next CQI report from the MS, RAN 220 executes a 'dithering' function that gradually adjusts (512) the scheduled MCS/MPR for the reported CQI range by varying, for the CQI range, the MCS scheduled for a downlink transmission to the MS between the first, currently scheduled MCS and a second, next higher or lower, MCS. Logic flow 500 then ends (514).

As is known in the art, an MPR is a value that corresponds to an effective number of information bits transmitted in a sub-band or over a sub-carrier and is a function of a corresponding MCS. For example and referring now to FIG. 6, a table 601 is provided that depicts a mapping of CQI values to MPR values and MCS schemes in accordance with an embodiment of the present invention. A first column 101 of table 601 lists ranges of CQI values, again typically integers, that may be reported by a MS. A second column 602 of table 601 lists MPR values corresponding to the CQI ranges, and a third column 102 of table 601 lists Modulation and Coding Schemes (MCSs) that are discretely mapped by a scheduler to the reported CQI values/determined MPR values. The MPR is equal to a coding rate of an MCS multiplied by a modulation order of the MCS.

In the prior art, based on a reported CQI value and a target HARQ Frame Error Rate (FER), a scheduler determines an MPR and a corresponding MCS that will achieve the target HARQ FER. For example and referring to table 601, if an MS reported a CQI value of 21, 22, or 23, then the scheduler would determine an MPR of 3 and schedule a 16-QAM (Quadrature Amplitude Modulation) (modulation order 4) modulation scheme and a ¾ coding rate, that is, an MCS of 16-QAM ¾, for downlink transmissions to the MS over a next scheduling period. This MCS is maintained until a next CQI report is received from the MS. If the MS next reported a CQI value of 24 or 25, then the scheduler would calculate an MPR of 4 and schedule a 64-QAM (Quadrature Amplitude Modulation) (modulation order 6) modulation scheme and a ⅔ coding rate, that is, an MCS of 64-QAM ⅔, for downlink transmissions to the MS over a next scheduling period. A Quadrature Phase Shift Keying (QPSK) modulation scheme has a modulation order of 2.

In contrast to the prior art, communication system 200, and in particular scheduler 222, performs a 'dithering' function that adjusts an MCS that is set based on a reported CQI value and which adjustment may occur prior to a next reported CQI value. More particularly, in performing a 'dithering' function, for a given CQI value range, scheduler 222 determines an intermediate MPR value between those listed in table 601, resulting in an alternating between the first MCS and the second MCS in scheduling succeeding downlink data bursts and a gradual transition from the first MCS to the second MCS over the multiple data bursts. The scheduler determines these intermediate MPR values based on channel condition indications other than, and in addition to, the reported CQI value.

Figure 6:
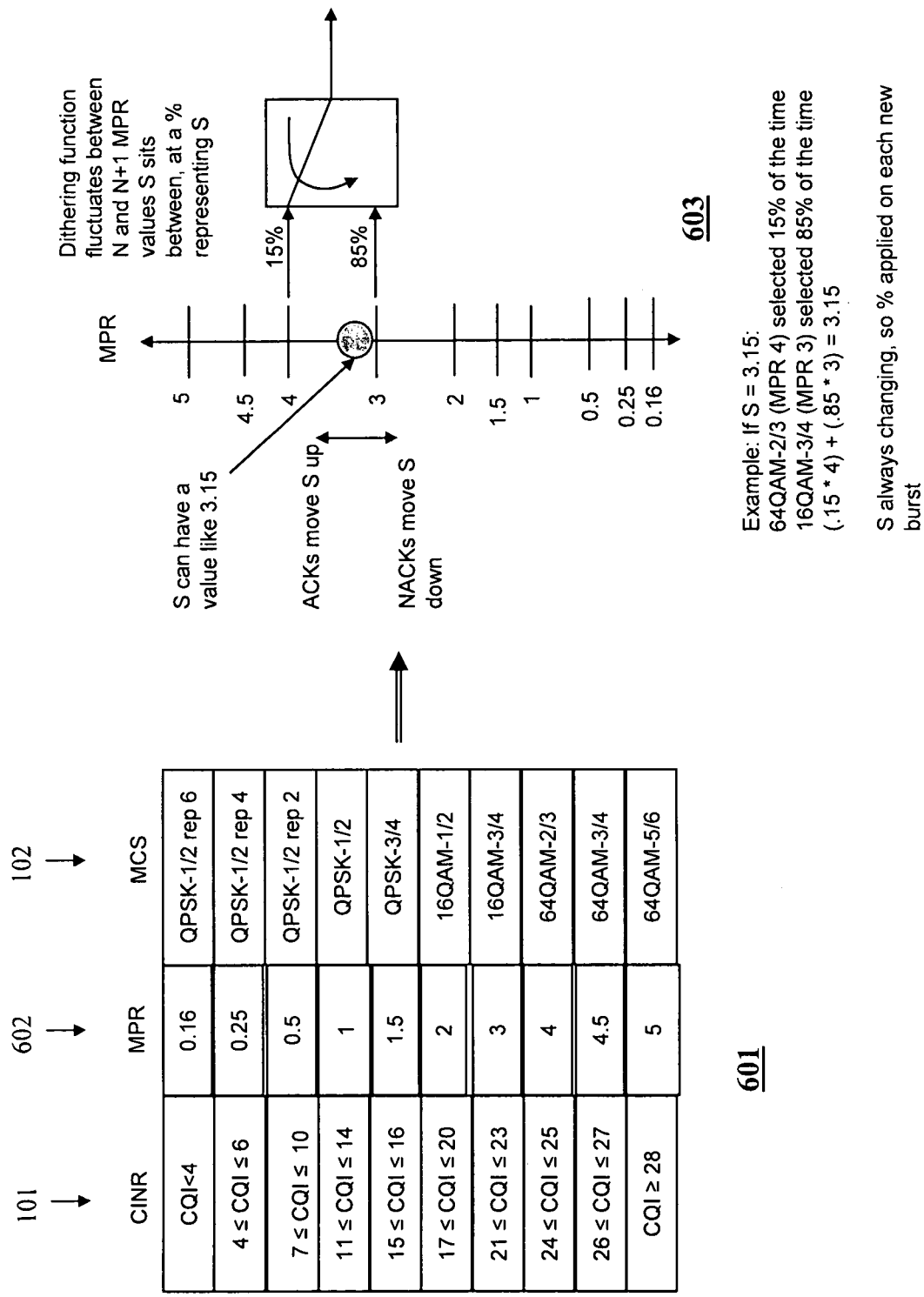
FIG. 6 comprises a table and line chart that depicts a mapping of CQI values to modulation and coding schemes (MCSs) and corresponding products of a modulation order and a coding rate (MPRs) in accordance with an embodiment of the present invention.
Figure 7:
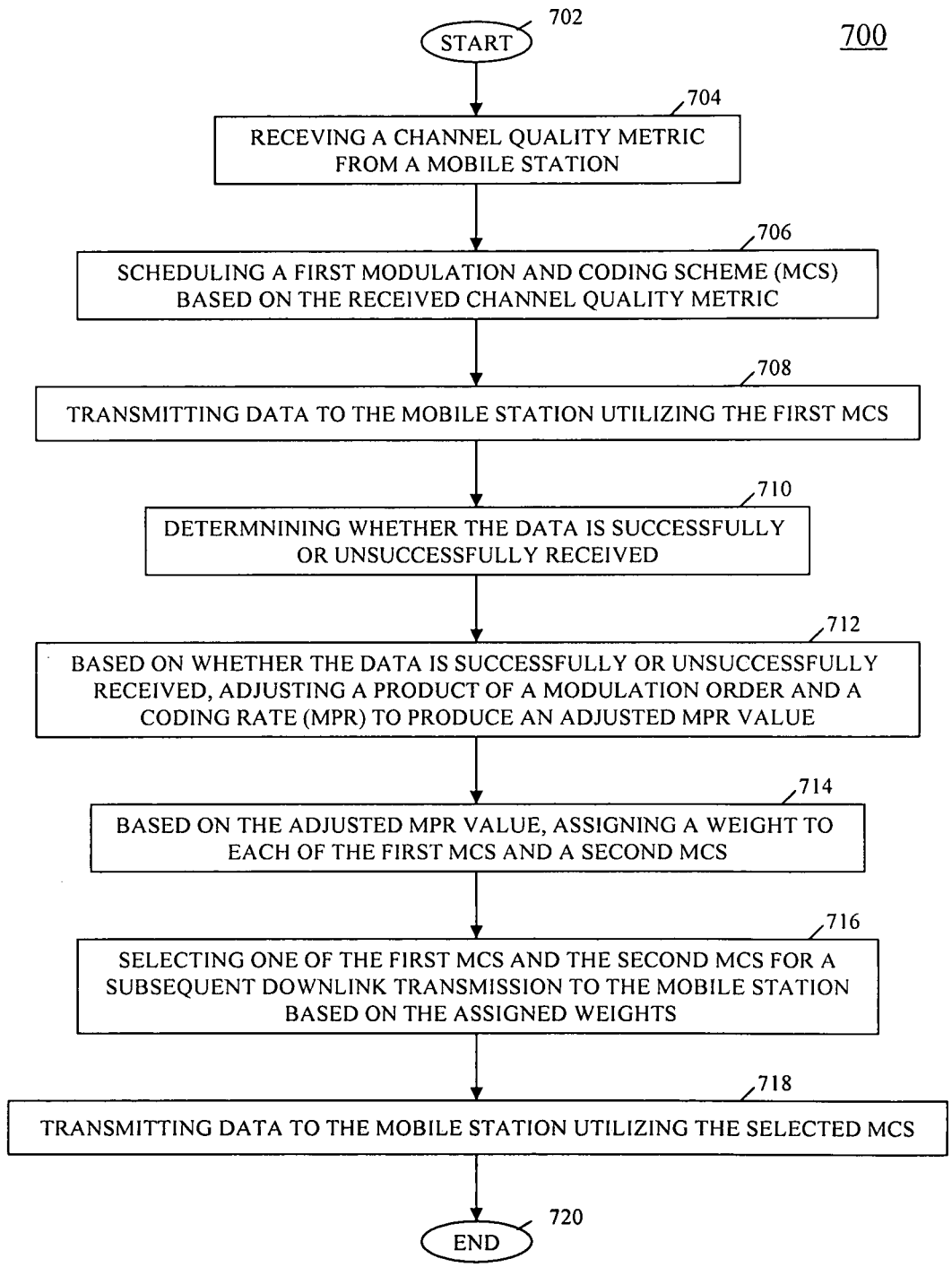
FIG. 7 is a logic flow diagram that illustrates an adjusting, by the scheduler of FIG. 2, of an MPR and MCS for downlink transmissions to a mobile station of FIG. 2 in accordance with an embodiment of the present invention.

FIGS. 6 and 7 provide a line chart 603 and a logic flow diagram 700, respectively, that illustrate an implementation of a dithering function by scheduler 222 in adjusting an MPR and selecting of an MCS for downlink transmissions to an MS in accordance with an embodiment of the present invention. Logic flow diagram 700 begins (702) when the MS, for example, MS 202, reports to scheduler 222, and the scheduler receives (704), a CQI value. For example and referring to line chart 603 of FIG. 6, suppose MS 202 initially reports a CQI value of 22. Based on the received CQI value, scheduler 222 then schedules (706) a first MCS corresponding to the reported CQI value. For example, when a CQI value of 22 is reported, scheduler 222 schedules an MCS of 16-QAM ¾ (a 16-QAM modulation scheme and a coding rate of ¾), corresponding to an MPR of 3, for a downlink data burst and transmits the data burst (708) to MS 202 utilizing the scheduled MCS.

In response to transmission of the burst, scheduler 222 determines (710) whether the data burst is successfully or unsuccessfully received and, based on the determination, adjusts (712) an MPR value corresponding to the selected MCS, that is, adjusts the MPR value to produce an adjusted MPR value that is intermediate between the MPR values in chart 601. Based on the adjusted MPR value, scheduler 222 assigns (714) a weight to each of the first MCS and a second, different MCS. Scheduler 222 then selects (716) an MCS, that is, one of the first MCS and the second MCS, for a subsequent downlink transmission to the reporting MS, that is, MS 202, based on the assigned weights and transmits (718) one or more of a retransmission of the received data or a new data burst to the MS utilizing the selected MCS. Logic flow 700 then ends (720).

That is and again referring to line chart 603, in response to transmission of the burst and when the burst is correctly received and decoded, scheduler 222 receives a HARQ acknowledgement (ACK). When the burst is erroneously received or decoded, the scheduler receives a HARQ negative acknowledgement (NACK) or no acknowledgment at all. Receipt of a HARQ ACK by RAN 220 indicates that the scheduled MCS provides, at the least, acceptable data reception for MS 202 and that scheduler 222 may be able to adjust the MCS to a more aggressive, that is, higher throughput MCS, such as an MCS of 64-QAM ⅔ (a 64-QAM modulation scheme and a coding rate of ⅔), corresponding to an MPR of 4. On the other hand, receipt of a HARQ NACK (or failure to receive a HARQ ACK) by RAN 220 may indicate that the scheduled MCS provides unacceptable data reception for MS 202 and that it may be desirable to adjust the MCS to a lower throughput scheme with greater error protection, such as an MCS of 16-QAM ½ (a 16-QAM modulation scheme with a coding rate of ½), corresponding to an MPR of 2.

However, a discrete stepping up of the MCS to a next higher MCS (e.g., corresponding to a step up from an MPR=3 to an MPR=4) based on each received ACK may result in massive packet loss if conditions do not warrant the higher MCS and could also result in a scheduling ping pong back-and-forth between the two MCS schemes. Similarly, a discrete stepping down of the MCS to a next lower MCS (e.g., corresponding to a step down from an MPR=3 to an MPR=2) based on each received NACK may result in an unwarranted diminishment in throughput. Therefore, communication system 200 provides for a gradual shift to a new MCS level.

More particularly, let 'S' represent a target MPR value. In response to receiving a CQI report from MS 202, scheduler 222 sets S to an MPR value corresponding to the reported CQI value. Each received HARQ ACK then advances S a fraction, or percentage, of the distance between the current value of S and the next higher discrete MPR value (for example, the MPR values listed in table 601), and each received HARQ NACK (or failure to ACK a HARQ transmission/retransmission) then drops S a fraction, or percentage, of the total distance between the current value of S and the next lower discrete MPR value. For example, suppose the initially received CQI value is one of 21, 22, or 23. Based on table 601, scheduler 222 then sets S to an MPR of 3 and schedules an MCS of '16-QAM ¾.' When scheduler 222 receives a HARQ ACK, the scheduler increases S by a predetermined fraction, or predetermined percentage, of the difference between the current MPR value (i.e., 3), or the lower of two discrete, adjacent MPR values if S is between the two MPR values, and a next higher MPR value (i.e., 4). For example, suppose the predetermined percentage is 5% of the difference between the two discrete, adjacent MPR values. When S in initially is set equal to 3 and a HARQ ACK is received, S is adjusted upward to 3.05. When three consecutive HARQ ACKs are received, S is adjusted to 3.15 (see FIG. 6) after receipt of the third ACK. If a HARQ NACK is then received, S is then adjusted downward to 3.10.

When the value of S resides between two MPR values (that is, between 3 and 4 in the above example), scheduler 222 uses the value of S to weight the MCS schemes corresponding to the two MPR values in order to select one of the two MSC schemes to schedule for a next downlink burst to the MS. For example and still referring to line chart 603, when S=3.15, scheduler 222 then executes an algorithm such that an MCS corresponding to an MPR of 3, that is, an MCS of 16-QAM ¾, is scheduled for the MS approximately 85% of the time and an MCS corresponding to an MPR of 4, that is, an MCS of 64-QAM ⅔, is scheduled for the MS approximately 15% of the time. In one exemplary algorithm, in such an instance, scheduler 222 may assign a weight of 0.85 to the MCS scheme corresponding to the lower MPR value, that is, an MPR=3, and a weight of 0.15 to the MCS scheme corresponding to the higher MPR value, that is, an MPR=4. Scheduler 222 then uses these weights to assign an MCS for a subsequent downlink transmission to the MS.

That is, based on the weights, scheduler 222 then generates a random number such that the lower level MCS scheme (16-QAM ¾), corresponding to an MPR=3, will be selected by the scheduler approximately 85% of the time and the higher level MCS scheme (64-QAM ⅔), corresponding to an MPR=4, will be selected by the scheduler for transmission of a burst to the MS approximately 15% of the time. For example, scheduler 222 may generate a random number between 1 and 100 such that a generated number between 1 and 85, inclusive, will result in the lower level MCS/MPR being selected by the scheduler and schedule for the MS, and a generated number between 86 and 100, inclusive, will result in the higher level MCS/MPR being selected by the scheduler and schedule for the MS. Based on the generated number, scheduler 222 then selects an MCS for a subsequent downlink burst to the MS and utilizes the selected MCS to transmit the burst.

Figure 8:
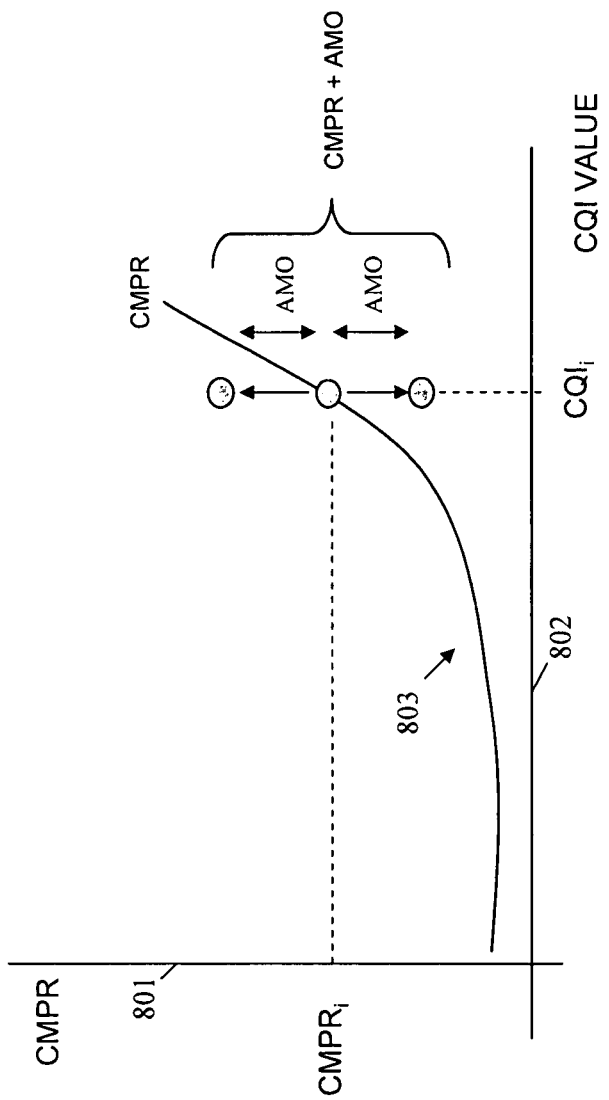
FIG. 8 is a graph depicting a mapping, by the scheduler of FIG. 2, of a reported CQI value to an MPR and an adjustment of the MPR based on Hybrid Automatic Repeat Request (HARQ) ACKs and NACKs in accordance with another embodiment of the present invention.
Figure 9:
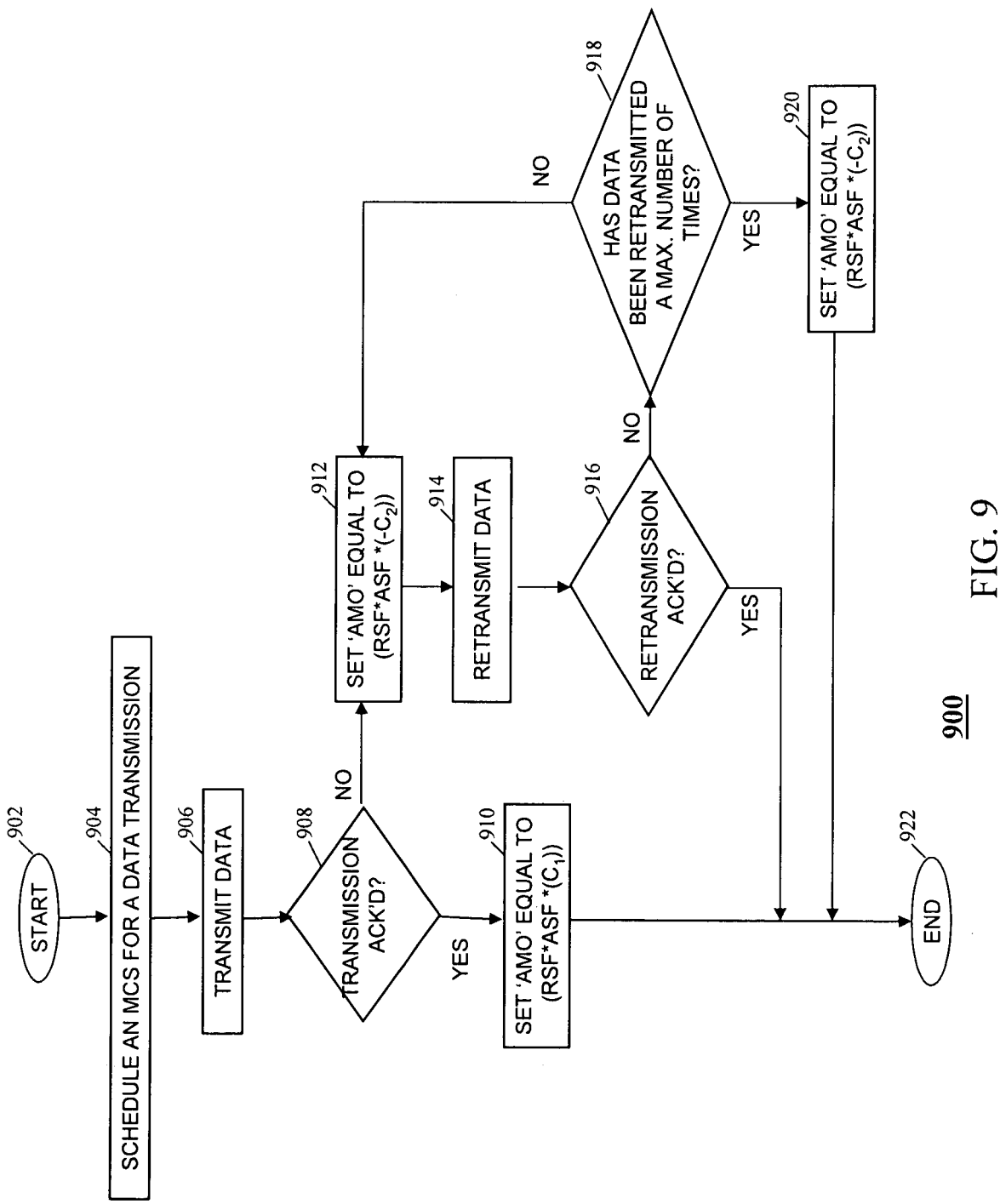
FIG. 9 is a logic flow diagram that illustrates an adjusting, by the scheduler of FIG. 2, of a MPR and, correspondingly, an MCS in accordance with another embodiment of the present invention.

FIGS. 8 and 9 depict an adjustment of an MPR and a selection of an MCS, based on HARQ ACKs and NACKs, by scheduler 222 for downlink transmissions to an MS in accordance with various other embodiments of the present invention. FIG. 8 is a graph 800 depicting a mapping of a reported CQI value to an MPR and an adjustment of the MPR based on HARQ ACKs and NACKs in accordance with an embodiment of the present invention. A horizontal axis 802 of graph 800 represents CQI values and a vertical axis 801 of graph 800 represents MPR values. A curve 803 of graph 800 then represents a mapping of CQI values to MPR values.

For example, curve 803 may be a curvilinear representation of the relationship between CQI values and MPR values depicted in columns 602 and 102 of table 601, which curve may be represented by the equation:

$$CMPR = A * \log_2(1 + B * 10^{(CQICH/10)}).$$

CQICH represents CQI values, preferably based on CINR measurements, that are reported via a CQI Channel (CQICH), CMPR is a CINR-based MPR (although one of ordinary skill in the art realizes that any channel quality metric may, instead, be used here), and A and B are constants used to curve fit the reported CQI values to the corresponding MPRs (that is, CMPRs in this instance). Typical values for A and B are 0.7 and 0.15, respectively. The values of A and B may be selected by a designer of the communication system based on how aggressive the designer wishes to be in assigning MPR and scheduling an MCS for an MS based on reported CQI values.

As described above, typically designers take a conservative approach to MCS scheduling so that an MCS scheduled based on a reported CQI will provide an acceptable MCS to a lowest common denominator among all possible MSs in all possible environments. Curve 803 may be generated based on simulations or field trials or via any other methodology known to one of ordinary skill in the art, as the methodology used to generate curve 803 is not critical to the present invention. Curve 803, or a tabular, such as table 601, or an algorithmic representation of the curve, preferably is stored in the at least one memory device 404 of scheduler 222.

Based on a CQI value reported by an MS ($CQI_i$) and by reference to curve 803 (or the corresponding table or algorithm), scheduler 222 determines an MPR ($CMPR_i$) and a corresponding MCS (see table 601) to schedule for the MS. Again, the reported CQI values typically are integers and the corresponding MPRs are discrete values. Scheduler 222 then adjusts the CMPR value, and corresponding scheduled MCS for the MS, based on whether the initial transmission of a scheduled data burst, and any subsequent re-transmissions of the data burst, are acknowledged.

For example and referring again to table 601, when the adjusted CMPR value is between two MPR values in the table (as the possible MCS schemes that may be scheduled are discrete), such as a CMPR (similar to S above)=3.15, scheduler 222 then executes an algorithm such that an MCS corresponding to an MPR of 3, that is, an MCS of 16-QAM ¾, is scheduled for the MS approximately 85% of the time and an MCS corresponding to an MPR of 4, that is, an MCS of 64-QAM ⅔, is scheduled for the MS approximately 15% of the time. In one exemplary algorithm, in such an instance, scheduler 222 may assign a weight of 0.85 to the lower MPR, that is, an MPR=3, and a weight of 0.15 to the higher MPR, that is, an MPR=4. Scheduler 222 then uses these weights to randomly assign a MCS to the MS and, based on an application of the weights (for example, using a randomly generated number as described above), scheduler 222 then selects an MCS for a next downlink burst to the MS. A new MCS then may be selected, based on a current value of CMPR, for each following data burst.

FIG. 9 is a logic flow diagram 900 illustrating an adjustment of a CMPR (referred to below more generically as an MPR) and a selection of an MCS by communication system 200, and in particular by scheduler 222, based on HARQ ACK/NACKs and various scaling factors, in accordance with the foregoing and various other embodiments of the present invention. Logic flow diagram 900 begins (902) when scheduler 222 determines an MPR and schedules (904) an MCS for a downlink transmission to an MS, for example, MS 202, based on a received CQI value. RAN 220 then transmits (906)

a data burst to the MS utilizing the scheduled MCS. When MS 202 correctly receives and decodes the transmission, the MS conveys a HARQ ACK to RAN 220. In response to receiving (908) the HARQ ACK, RAN 220 calculates (910) a positive Adjustable MPR Offset (AMO) and determines a new MPR ($MPR_{new}$) based on the calculated AMO and the current MPR ($MPR_{current}$). The AMO is an adjustable value that is applied as offset to a scheduled MPR value, such that $$MPR_{new}=MPR_{current}+AMO.$$

By calculating a positive AMO, RAN 220 adjusts the MPR to a higher level and, correspondingly, may adjust the scheduled MCS by executing a dithering function, as described above, based on the $MPR_{new}$.

When MS 202 erroneously receives or decodes the transmission, the MS does not acknowledge the transmission or conveys a HARQ NACK to RAN 220. Each time RAN 220 fails to receive (908, 916) a HARQ ACK within a predetermined time after transmitting or retransmitting the data, or receives a HARQ NACK, RAN 220 calculates (912, 920) a negative AMO and, again, determines a new MPR based on the calculated AMO and the current MPR. By calculating a negative AMO, RAN 220 adjusts the MPR to a lower level and, correspondingly, may adjust the scheduled MCS by executing a dithering function, as described above, based on the $MPR_{new}$.

In one embodiment of the present invention, MPR adjustments, that is the AMO value, are preserved across a change in MPR/CMPR resulting from a receipt of a new CQI report. That is, when a new CQI report arrives, a new MPR value (for example, a CMPR value when the MPR value is CINR-based) may be computed based on the received CQI report, that is, a new MPR value is determined that corresponds to the received CQI value (columns 101 and 602 of table 601). The MCS used for a next transmission of data to the reporting MS, that is MS 202, is then determined based on an adjusted value of the newly determined MPR value, that is, $MPR_{adjusted}$, where the newly determined MPR value is adjusted based on most recently determined MPR offset, that is, the last AMO determined prior to receipt of the new CQI report.

In other words, MCS used for a next transmission of data to the reporting MS is determined based on $MPR_{adjusted}$ where $MPR_{adjusted}=MPR_{new}+AMO_{current}$. More particularly, scheduler 222 assigns weights to each of an MCS corresponding to the new MPR value and to a next higher or lower MCS based the adjusted new MPR value, and based on the assigned weights the scheduler selects one of the MCS corresponding to the new MPR value and the another MCS for a subsequent transmission of data to the MS.

In other embodiments of present invention, however, the AMO value may reset to a default value, for example, zero (0), in response to receipt of a new CQI report or after receipt of a predetermined number of CQI reports. In such an event, the determined new MPR value that corresponds to the received CQI value is then adjusted by the default AMO value in order to determine an MCS for a subsequent transmission of data to the MS as descried above.

In order to moderate the rate of change of the MPR and MCS, various embodiments of the present invention provide various scaling factors (SFs) that are designed to moderate a rate of change of a scheduled MCS by moderating the changes in the AMO. A first such SF, referred to herein as a Repetition Scaling Factor (RSF), scales an adjustment of the AMO based on a current MPR level. As can be seen from table 601 and curve 803, the relationship between CQI values and MPR values is non-linear. As a result, at low MPR values, a small change in an MPR value may move the MPR to a new MCS level, whereas at higher MPR values a larger change in an MPR value is required to move the MPR to a new MCS level. Therefore, in order to prevent rapid changes in scheduled MCSs when employing a low MPR and a low level MCS, RSF scales adjustments in AMO based on where, in table 601 or curve 803, scheduler 222 is currently scheduling the MS. For example, RSF may be determined as follows, $$RSF=MPR+AMO(AMO \text{ initially is set equal to } 0),$$

$$RSF=\min(RSF,1), \text{ and}$$

$$RSF=\max(RSF,0.16).$$

It is apparent that the lower the MPR level, the smaller the RSF, and as the MPR level increases, so does the RSF.

A second SF, referred to herein as an Aging Scaling Factor (ASF), scales the AMO based on how often data bursts are being sent to an MS. That is, depending upon traffic levels at a BS/AP serving an MS, an MS may be infrequently scheduled for a data burst, such as only once every several (for example, 50) frames, or may be frequently scheduled for a data burst, such as for several data bursts in a single frame. For example, a WiMAX system permits an MS to be scheduled for as many as five data bursts in a single frame. When multiple data bursts are conveyed to an MS every frame, adjusting an MCS every time a new data burst, that is, an original HARQ transmission, is conveyed and acknowledged, or not acknowledged, may produce excessively rapid changes in an MCS scheduled for an MS. Therefore, in order to prevent rapid jumps in an MCS when original data bursts are being frequently scheduled for an MS, the ASF scales adjustments in AMO in inverse relation to the frequency (in time) of such transmissions. As an example, ASF may be set as follows, ASF=min(3, AT) for a fast start, where an MPR and an corresponding MCS are more aggressively adjusted after being initially scheduled, and ASF=min(1, AT/(12)) for normal operation.

'AT' is an 'Age Time' factor that corresponds to an expiration of time, for example, a number of frames, between successively received original HARQ transmissions. When AT corresponds to a number of frames between successively received original HARQ transmission and multiple original HARQ transmissions are received in a single frame, AT may be set equal to 0 for each such transmission received in the same frame. In another embodiment of the present invention, ASF may be further reduced proportional to the number of bursts sent in the frame so that all incoming data is utilized in the computation of AMO. For example, if 5 bursts are sent in a same frame, ASF would be ⅕ the value it would have been with 1 burst in the frame. It is apparent that the more frequently data bursts are scheduled for an MS, the fewer the number of frames between successively received original HARQ transmissions and the smaller the ASF scaling factor.

Referring again to FIG. 9, when RAN 220 transmits (906) a data burst to MS 202 and receives (908), from the MS, a HARQ ACK, scheduler 222 resets (910) the AMO such that AMO=RSF*ASF*($C_1$), wherein $C_1$ is a first constant (for example, 0.1) that is set by a designer of the system. Scheduler 222 then re-determines an MPR and corresponding MCS for the MS based on the current MPR and the reset AMO, that is, $MPR_{new}=MPR_{current}+AMO$. Logic flow 900 then ends (922). When RAN 220 transmits (906) a data burst to MS and fails to receive a HARQ ACK within a predetermined time after transmitting the data or receives (908) a HARQ NACK, scheduler 222 resets (912) the AMO such that AMO=RSF*ASF*($-C_2$), wherein $C_2$ is a second constant (for example, 0.2) that also is set by a designer of the system. Scheduler 222 then re-determines an MPR and corresponding MCS for the MS based on the current MPR and the reset AMO, that is, $MPR_{new}=MPR_{current}+AMO$. The constants $C_1$ and $C_2$ are selected such that they provide a controlled rate of change in MRP and MCS. RAN 220 then retransmits (914) the data to the MS.

If RAN 220 receives (916) a HARQ ACK for the retransmitted data, then logic flow 900 ends (922). If RAN 220 fails to receive (916) a HARQ ACK within a predetermined time period after retransmitting the data or receives a HARQ NACK, and the data has not yet been retransmitted (918) a maximum number of times permitted by communication system 200, scheduler 222 again resets (912) the AMO such that $AMO=RSF*ASF*(-C_2)$ and re-determines an MPR and corresponding MCS for the MS based on the current MPR and the reset AMO (again, $MPR_{new}=MPR_{current}+AMO$). Steps 914, 916, 918, and 912 then are repeated until a HARQ retransmission is acknowledged or the data is retransmitted (918) a maximum number of times without receipt of a HARQ ACK. After the data has been retransmitted (918) a maximum number of times permitted by communication system 200 without receipt of a HARQ ACK, scheduler 222 resets (920) the AMO one last time, again such that $AMO=RSF*ASF*(-C_2)$, and logic flow 900 then ends (922).

Figure 10:
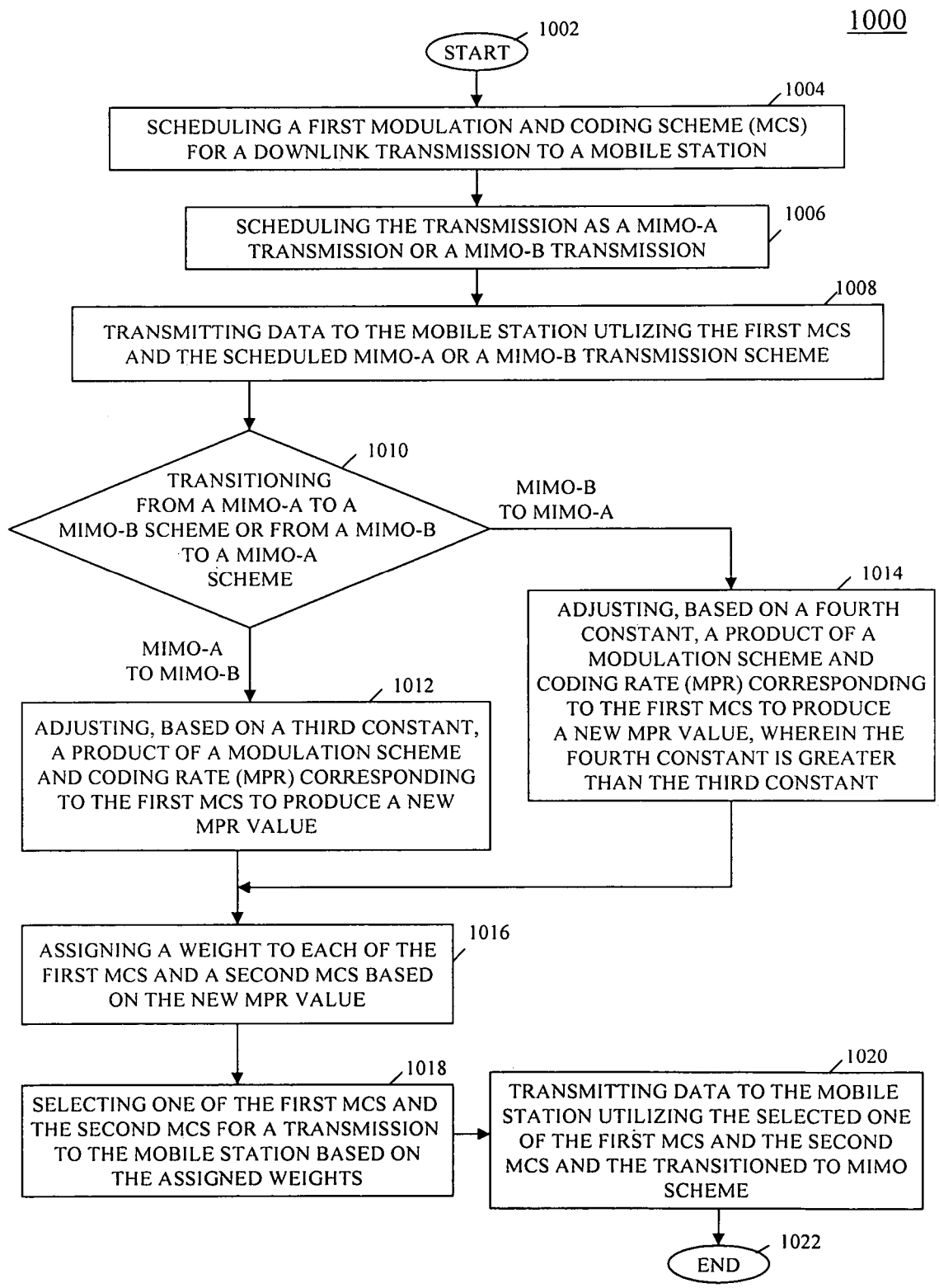
FIG. 10 is a logic flow diagram that illustrates an adjusting, by the scheduler of FIG. 2, of a MPR and, correspondingly, an MCS in accordance with another embodiment of the present invention.

FIG. 10 is a logic flow diagram 1000 that depicts an adjustment of a MPR and, correspondingly, an MCS by scheduler 222 in accordance with yet another embodiment of the present invention. Logic flow diagram 1000 begins (1002) when RAN 220 schedules (1004) a first MCS (and a corresponding MPR) for a downlink transmission to an MS, for example, MS 202, and further schedules (1006) the transmission as a MIMO-A or a MIMO-B transmission. The BS/AP then transmits (1008) a data burst to MS 202 using the first MCS and the scheduled MIMO-A or MMIMO-B transmission scheme. As is known in the art, when the RAN, and in particular the BS or AP, transmits to an MS using two transmit antennas, a MIMO-A scheme transmits one data stream via both antennas (the version of the data sent via a second of the two antennas may be a modified version of the data sent via the first of the two antennas), and a MIMO-B scheme transmits a different data stream via each antenna, thereby doubling the data rate of MIMO-A.

Typically, an MS controls whether a RAN will transmit using MIMO-A or MIMO-B. That is, when the MS feeds back CQI values, the MS will puncture bits in the CQI report to indicate whether to transmit using MIMO-A or MIMO-B. A transition from MIMO-A to MIMO-B results in a higher data rate but may create more interference for the transmission to the MS. However, when making the transition, the RAN does not know the level of interference that will result from the transition. Therefore, communication system 200 may be more aggressive in scheduling an MCS when transitioning from MIMO-B to MIMO-A than when transitioning from MIMO-A to MIMO-B.

For example, when RAN 220, and in particular the BS or AP of the RAN, transitions (1010) from MIMO-A to MIMO-B, scheduler 222 adjusts (1012) an MPR corresponding to the scheduled MCS by adjusting a current AMO value based on a third constant, '$C_{A-TO-B}$', (that is, multiplying the current AMO value by $C_{A-TO-B}$) (for example, $C_{A-TO-B}=0.4$), to produce a new AMO value ($AMO_{new}$). The new AMO value is used to calculate a new MPR value, that is, $MPR_{new}$, where $MPR_{new}=MPR_{current}+AMO_{new}$ and where the $MPR_{new}$ value may be between two MPR values in the table 601. Based on the new MPR value, scheduler 222 assigns (1016) a weight to each of the first MCS and a second, different MCS as is described in detail above with respect to FIG. 7. Scheduler 222 then selects (1018) an MCS, that is, one of the first MCS and the second MCS, for a subsequent downlink transmission to the reporting MS, that is, MS 202, based on the assigned weights, again as is described in detail above with respect to FIG. 7, and transmits (1020) one or more of a retransmission of the received data or a new data burst to the MS utilizing the selected MCS and MIMO-B. Logic flow 1000 then ends (1022).

On the other hand, when RAN 220 transitions (1010) from MIMO-B to MIMO-A, scheduler 222 may adjust (1014) the MPR corresponding to the scheduled MCS by adjusting the current AMO value based on a fourth constant, '$C_{B-TO-A}$', (that is, multiplying the current AMO value by $C_{B-TO-A}$) (for example, $C_{B-TO-A}=1.6$), to produce a new AMO value ($AMO_{new}$). The new AMO value is used to calculate a new MPR value, that is, $MPR_{new}$, where $MPR_{new}=MPR_{current}+AMO_{new}$ and where the $MPR_{new}$ value may be between two MPR values in the table 601. Based on the new MPR value, scheduler 222 assigns (1016) a weight to each of the first MCS and a second, different MCS, selects (1018) an MCS, that is, one of the first MCS and the second MCS, for a subsequent downlink transmission to the reporting MS, that is, MS 202, based on the assigned weights, and transmits (1020) one or more of a retransmission of the received data or a new data burst to the MS utilizing the selected MCS and MIMO-A. Logic flow 1000 then ends (1014).

The fourth constant, $C_{B-TO-A}$, is greater than the third constant, $C_{A-TO-B}$, and therefore results in a more aggressive MPR, and corresponding MCS, adjustment. Thus, by adjusting AMO and correspondingly MPR, communication system 200 may factor in MIMO transitions, and the direction of such transitions, when scheduling an MCS.

This mechanism operates effectively when the $C_{B-TO-A}$ and $C_{A-TO-B}$ constants can be reasonably well predicted for a given deployment of MSs. However, in another embodiment of the present invention, the MPR value for MIMO-A may be kept entirely independent of the MPR value for MIMO-B. That is, an MPR value determined for a MIMO-A mode or a MIMO-B mode is determined independent of an MPR value determined for the other mode, for example, determined based on a most recently received CQI value, and is not a function of an MPR value determined for the other mode prior to a switch of modes. When an MS switches MIMO modes, scheduler 222 stores the MPR value most recently determined for the switched-from mode in at least one memory device 404. Scheduler 222 then may utilize the stored MPR value for an assignment of weights to each of a first and second MCS at step 1016 above if the MS switches back to the switched-from mode. This prevents any possible error that could occur when applying the $C_{B-TO-A}$ and $C_{A-TO-B}$ constant multipliers.

Scheduler 222 then may decay, that is, that is, gradually decrease over time, the MPR value maintained by the scheduler for a given MIMO mode while an MS, such as MS 202, is using the other MIMO mode, so a maximum time $T_{decay}$ is used such that if the MIMO mode associated with this particular MPR value has not been used in time $T_{decay}$, then the scheduler may reset the maintained MPR value to '0' and upon next use will undergo a wholly new MPR value is determined. For example, if the MPR value last determined for MIMO-A mode, that is, $MPR_{MIMO-A}$, was '2.3', and an MS then switched to MIMO-B mode, the MPR value 2.3 would be stored by the scheduler for the MIMO-A mode. If the MS stayed in MIMO-B for longer than $T_{decay}$, then $MPR_{MIMO-A}$ would be reset to 0. However, if the MS switched back to MIMO-A before $T_{decay}$, then the maintained MPR$_{MIMO-A}$ value would begin to be used, subject to any decaying of the MPR$_{MIMO-A}$ value that may have occurred since the switch to MIMO-B.

By considering present and past reported CQI values as well as other individual indications of channel conditions in scheduling an Modulation and Coding Scheme (MCS) for an MS, and then executing a 'dithering' function in order to effectuate, over time and in association with received CQI values and/or in association a transition from a MIMO-A to a MIMO-B transmission scheme or from a MIMO-B to a MIMO-A transmission scheme, an MCS scheme for the MS that is intermediate between two adjacent discrete MCS schemes, communication system 200 implements an adaptive scheduling scheme that is individually tailored to the capabilities of the MS and that permits more aggressive scheduling for some MSs as opposed to other MSs reporting a same CQI value.

In one embodiment of the present invention, communication system 200 receives, from an MS, a channel quality metric associated with a frequency bandwidth, determines a first MCS based on the received channel quality metric, and transmits data utilizing the first MCS. The communication system determines whether the transmitted data is acknowledged by the MS, assigns weights to each of the first MCS and a second MCS based on the determination of whether the transmitted data is acknowledged, and based on the assigned weights, selects one of the first MCS and the second MCS for a subsequent transmission of data to the MS.

In another embodiment of the present invention, when communication system 200 transmits data utilizing a first MCS and one of a Multiple Input Multiple Output (MIMO)-A transmission scheme and a MIMO-B transmission scheme and then transitions to the other transmission scheme, the communication system may assign weights to each of the first MCS and a second MCS based on whether the transition is from MIMO-A to MIMO-B or MIMO-B to MIMO-A and, based on the assigned weights, select one of the first MCS and the second MCS for a subsequent transmission of data to the MS.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for scheduling a downlink transmission in an Orthogonal Frequency Division Multiplexing communication system the method comprising:
  receiving, from a mobile station, a channel quality metric associated with a frequency bandwidth;
  determining a first Modulation and Coding Scheme (MCS) based on the received channel quality metric;
  determining a product of a modulation order and a coding rate (MPR) value associated with the first MCS;
  transmitting data utilizing the first MCS;
  determining whether the transmitted data is acknowledged;
  based on the determination of whether the transmitted data is acknowledged, adjusting the MPR value to produce an adjusted MPR value and wherein adjusting the MPR comprises adjusting the MPR value downwards when the transmitted data is not acknowledged; adjusting the MPR value upwards when the transmitted data is acknowledged; and wherein the adjustment in the MPR is a fraction of a distance between a currently determined MPR value and a discrete next higher or lower MPR value; and
  assigning weights to each of the first MCS and a second MCS based on the adjusted MPR value; and
  based on the assigned weights, selecting one of the first MCS and the second MCS for a subsequent transmission of data to the mobile station.

2. The method of claim 1, wherein selecting one of the first Modulation and Coding Scheme (MCS) and the second MCS comprises randomly selecting one of the first MCS and the second MCS based on the assigned weights.

3. The method of claim 1, wherein an amount by which the product of a modulation order and a coding rate (MPR) value is adjusted may be represented by an MPR offset value and wherein the method further comprises:
  receiving, from the mobile station, another channel quality metric;
  determining a new MPR value based on the received channel quality metric;
  adjusting the new MPR value by the MPR offset value most recently determined prior to receiving the another channel quality metric to produce an adjusted new MPR value; and
  based on the adjusted new MPR value, assigning weights to each of an Modulation and Coding Scheme (MCS) corresponding to the new MPR value and to another MCS; and
  based on the assigned weights, selecting one of the MCS corresponding to the new MPR value and the another MCS for a subsequent transmission of data to the mobile station.

4. The method of claim 1, wherein adjusting the product of a modulation order and a coding rate (MPR) value further comprises scaling an adjustment of the MPR value based on a current level of the MPR value.

5. The method of claim 4, wherein the higher the current level of the product of a modulation order and a coding rate (MPR) value, the larger a scaling factor that is applied in an adjustment of the MPR value based on a current level of the MPR value.

6. The method of claim 1, wherein adjusting the MPR value further comprises scaling an adjustment of the MPR value based on a time period expiring between received original Hybrid Repeat Request (HARM) transmissions.

7. The method of claim 6, wherein the shorter the time period expiring between received original Hybrid Repeat Request (HARQ) transmissions, the smaller a scaling factor that is applied in an adjustment of the MPR value based on the time period expiring between received original HARQ transmissions.

8. The method of claim 1, wherein the weights correspond to a non-zero likelihood that the first MCS will be selected and a non-zero likelihood that the second MCS will be selected for the subsequent transmission of data.

9. A scheduler operable in an Orthogonal Frequency Division Multiplexing communication system, the scheduler configured to receive, from a mobile station, a channel quality metric associated with a frequency bandwidth, determine a first Modulation and Coding Scheme (MCS) based on the received channel quality metric, determine a first Modulation and Coding Scheme (MCS) based on the received associated quality metrics, determine a product of the modulation order and coding rate (MPR) value associated with the first MCS, transmit data utilizing the first MCS, determine whether the transmitted data is acknowledged, based on the determination of whether the transmitted data is acknowledged, adjust the MPR value to produce an adjusted MPR value by adjusting the MPR value downwards when the transmitted data is not acknowledged and adjusting the MPR value upwards when the transmitted data is acknowledged, and wherein the adjustment in the MPR is a fraction of a distance between a currently determined MPR value and a discrete next higher or lower MPR value, assign weights to each of the first MCS and a second MCS based on the adjusted MPR value and, based on the assigned weights, selecting one of the first MCS and the second MCS for a subsequent transmission of data to the mobile station.

10. The scheduler of claim 9, wherein the scheduler is configured to select one of the first Modulation and Coding Scheme (MCS) and the second MCS by randomly selecting one of the first MCS and the second MCS based on the assigned weights.

11. The scheduler of claim 9, wherein the scheduler is configured to adjust the product of a modulation order and a coding rate (MPR) value also by scaling an adjustment of the MPR value based on a current level of the MPR value.

12. The scheduler of claim 11, wherein the higher the current level of the product of a modulation order and a coding rate (MPR) value, the larger a scaling factor that the scheduler applies in an adjustment of the MPR value based on a current level of the MPR value.

13. The scheduler of claim 9, wherein the scheduler is configured to adjust the MPR value also by scaling an adjustment of the product of a modulation order and a coding rate (MPR) value based on a time period expiring between received original Hybrid Repeat Request (HARQ) transmissions.

14. The scheduler of claim 13, wherein the shorter the time period expiring between received original Hybrid Repeat Request (HARQ) transmissions, the smaller a scaling factor that the scheduler applies in an adjustment of the product of a modulation order and a coding rate (MPR) value based on the time period expiring between received original HARQ transmissions.

15. An Access Point comprising the scheduler of claim 9.

16. The scheduler of claim 9, wherein the weights correspond to a non-zero likelihood that the first MCS will be selected and a non-zero likelihood that the second MCS will be selected for the subsequent transmission of data.

17. A method for scheduling a downlink transmission in an Orthogonal Frequency Division Multiplexing communication system the method comprising:

receiving, from a mobile station, a channel quality metric associated with a frequency bandwidth;

determining a first Modulation and Coding Scheme (MCS) based on the received channel quality metric;

determining a product of a modulation order and a coding rate (MPR) value associated with the first MCS;

transmitting data utilizing the first MCS;

determining whether the transmitted data is acknowledged;

based on the determination of whether the transmitted data is acknowledged, adjusting the MPR value to produce an adjusted MPR value and wherein adjusting the MPR comprises scaling an adjustment of the MPR value based on a current level of the MPR value; and assigning weights to each of the first MCS and a second MCS based on the adjusted MPR value; and based on the assigned weights, selecting one of the first MCS and the second MCS for a subsequent transmission of data to the mobile station.

18. The method of claim 17, wherein the higher the current level of the product of a modulation order and a coding rate (MPR) value, the larger a scaling factor that is applied in an adjustment of the MPR value based on a current level of the MPR value.

19. A method for scheduling a downlink transmission in an Orthogonal Frequency Division Multiplexing communication system the method comprising:

receiving, from a mobile station, a channel quality metric associated with a frequency bandwidth;

determining a first Modulation and Coding Scheme (MCS) based on the received channel quality metric;

determining a product of a modulation order and a coding rate (MPR) value associated with the first MCS;

transmitting data utilizing the first MCS;

determining whether the transmitted data is acknowledged;

based on the determination of whether the transmitted data is acknowledged, adjusting the MPR value to produce an adjusted MPR value and wherein adjusting the MPR comprises scaling an adjustment of the MPR value based on a time period expiring between received original Hybrid Repeat Request (HARQ) transmissions; and assigning weights to each of the first MCS and a second MCS based on the adjusted MPR value; and based on the assigned weights, selecting one of the first MCS and the second MCS for a subsequent transmission of data to the mobile station.

20. The method of claim 19, wherein the shorter the time period expiring between received original Hybrid Repeat Request (HARQ) transmissions, the smaller a scaling factor that is applied in an adjustment of the MPR value based on the time period expiring between received original HARQ transmissions.

21. A scheduler operable in an Orthogonal Frequency Division Multiplexing communication system, the scheduler configured to receive, from a mobile station, a channel quality metric associated with a frequency bandwidth, determine a first Modulation and Coding Scheme (MCS) based on the received channel quality metric, determine a product of the modulation order and coding rate (MPR) value associated with the first MCS, transmit data utilizing the first MCS, determine whether the transmitted data is acknowledged, based on the determination of whether the transmitted data is acknowledged, adjust the MPR value to produce an adjusted MPR value by scaling an adjustment of the MPR value based on a current level of the MPR value, assign weights to each of the first MCS and a second MCS based on the adjusted MPR value and, based on the assigned weights, select one of the first MCS and the second MCS for a subsequent transmission of data to the mobile station.

22. The scheduler of claim 21, wherein the higher the current level of the product of a modulation order and a coding rate (MPR) value, the larger a scaling factor that the scheduler applies in an adjustment of the MPR value based on a current level of the MPR value.

23. A scheduler operable in an Orthogonal Frequency Division Multiplexing communication system, the scheduler configured to receive, from a mobile station, a channel quality metric associated with a frequency bandwidth, determine a first Modulation and Coding Scheme (MCS) based on the received channel quality metric, determine a product of the modulation order and coding rate (MPR) value associated with the first MCS, transmit data utilizing the first MCS, determine whether the transmitted data is acknowledged, based on the determination of whether the transmitted data is acknowledged, adjust the MPR value to produce an adjusted MPR value by scaling an adjustment of the MPR value based on a time period expiring between received original Hybrid Repeat Request (HARQ) transmissions, assign weights to each of the first MCS and a second MCS based on the adjusted MPR value and, based on the assigned weights, select one of the first MCS and the second MCS for a subsequent transmission of data to the mobile station.

24. The scheduler of claim 23, wherein the shorter the time period expiring between received original Hybrid Repeat Request (HARQ) transmissions, the smaller a scaling factor that the scheduler applies in an adjustment of the product of a modulation order and a coding rate (MPR) value based on the time period expiring between received original HARQ transmissions.

* * * * *